United States Patent
Hinton et al.

(10) Patent No.: US 8,615,792 B2
(45) Date of Patent: Dec. 24, 2013

(54) METHOD AND SYSTEM FOR POLICY DRIVEN DATA DISCLOSURE

(75) Inventors: Heather M. Hinton, Austin, TX (US); Donald N. Jones, Cary, NC (US); Masakazu Miyamoto, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/648,813

(22) Filed: Dec. 29, 2009

(65) Prior Publication Data

US 2011/0162089 A1 Jun. 30, 2011

(51) Int. Cl.
- *G06F 7/04* (2006.01)
- *G06F 17/30* (2006.01)
- *H04L 29/06* (2006.01)
- *G06F 12/14* (2006.01)

(52) U.S. Cl.
USPC ............................................... 726/6; 726/28

(58) Field of Classification Search
USPC ........................................................ 726/6, 28
See application file for complete search history.

(56) References Cited

U.S. PATENT DOCUMENTS

| 6,006,333 | A * | 12/1999 | Nielsen ............................... 726/8 |
| 7,139,838 | B1 | 11/2006 | Squire et al. |
| 7,716,242 | B2 * | 5/2010 | Pae et al. ......................... 707/783 |
| 7,926,089 | B2 * | 4/2011 | Tulshibagwale et al. ......... 726/4 |
| 8,140,527 | B2 * | 3/2012 | Halme et al. .................... 707/732 |
| 2004/0128546 | A1 * | 7/2004 | Blakley et al. ................. 713/201 |
| 2005/0027980 | A1 | 2/2005 | Peled et al. |
| 2006/0085443 | A1 * | 4/2006 | Pae et al. ......................... 707/100 |
| 2008/0010665 | A1 | 1/2008 | Hinton et al. |
| 2009/0300716 | A1 * | 12/2009 | Ahn .................................... 726/1 |
| 2010/0223379 | A1 | 9/2010 | Tantawi et al. |
| 2011/0289314 | A1 | 11/2011 | Whitcomb |

FOREIGN PATENT DOCUMENTS

EP 1318465 A2 3/2002

* cited by examiner

*Primary Examiner* — Michael Simitoski
(74) *Attorney, Agent, or Firm* — Terrile, Cannatti, Chambers & Holland, LLP; Stephen A. Terrile (57) ABSTRACT

A method, system and computer-usable medium are disclosed for controlling access to attribute information. A request is received from an application for attribute information. An attribute release policy associated with the requesting application is used to filter attributes stored in a datastore. The filtered attributes are then provided to the requesting application.

16 Claims, 8 Drawing Sheets

METHOD AND SYSTEM FOR POLICY DRIVEN DATA DISCLOSURE

CROSS-REFERENCE TO RELATED APPLICATION

This application is related to U.S. patent application Ser. No. 12/648,876, entitled "Method and System for Policy Driven Data Distribution," filed on Dec. 29, 2009, which describes exemplary methods and systems and is incorporated by reference in its entirety.

BACKGROUND OF THE INVENTION

1. Field of the Invention

Embodiments of the disclosure relate in general to the field of computers and similar technologies, and in particular to software utilized in this field. Still more particularly, it relates to controlling access to attribute information.

2. Description of the Related Art

In recent years, companies have become increasingly concerned about the security of their information and how it is used. As a result, a wide variety of security mechanisms have been implemented to not only authenticate users, but to also control their access to information. Companies are also becoming concerned about the internal and external distribution and release of information, including personally-identifiable information (PII), not only to individuals, but to applications as well. Accordingly, companies are beginning to implement data release policies to control application access to data.

However, their concerns extend beyond simply ensuring that users and applications can only access information to which they are entitled or authorized. Access to information must also be flexible, with different policies applied and enforced for users and applications alike. These concerns also encompass the need for controlling an application's access to identity and attribute information. As a result, there is a need to define and enforce controls for an application's access to information based on its related metadata. Currently, no means exist for providing policy-based, controlled access and release of attribute and identity information to applications. In view of the foregoing, there is a need for scalable and manageable access controls that provide enforceable release policies, not only for users, but for new and existing applications as well.

BRIEF SUMMARY OF THE INVENTION

The present invention includes, but is not limited to, a method, system and computer-usable medium for controlling access to attribute information. In various embodiments, an attribute release policy management module is implemented to manage the release of attribute information according to an attribute release policy. In these and other embodiments, a request is received from an application for attribute information. An attribute release policy associated with the requesting application is then used to filter attributes stored in a datastore. The filtered attributes are then provided to the requesting application.

In one embodiment, the attributes available to a first application are stored in a first datastore and filtered according to a first attribute release policy. In another embodiment, the attributes available to a second application are stored in the first datastore and filtered according to a second attribute release policy, In yet another embodiment, the attributes available to a first and second application are respectively stored in a first and second datastore and are respectively filtered according to corresponding first and second attribute release policies.

In one embodiment, the first attribute release policy is used to filter attributes used by a plurality of applications and the filtered attributes are stored in a first datastore. Upon receiving a request for attributes from one of the plurality of applications, a second, corresponding attribute release policy is used to produce a double-filtered set of attributes for the requesting application. In another embodiment, a plurality of attribute release policies, each corresponding to one or more of a plurality of applications, are stored in a centralized master data hub and are associated with each respective application. In another embodiment, the filtering of attributes for a downstream application is performed by an intermediary attribute release policy. In yet another embodiment, the filtering of attributes is performed according to specifics of the requesting application. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and computer-usable medium are disclosed for controlling access to attribute information. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
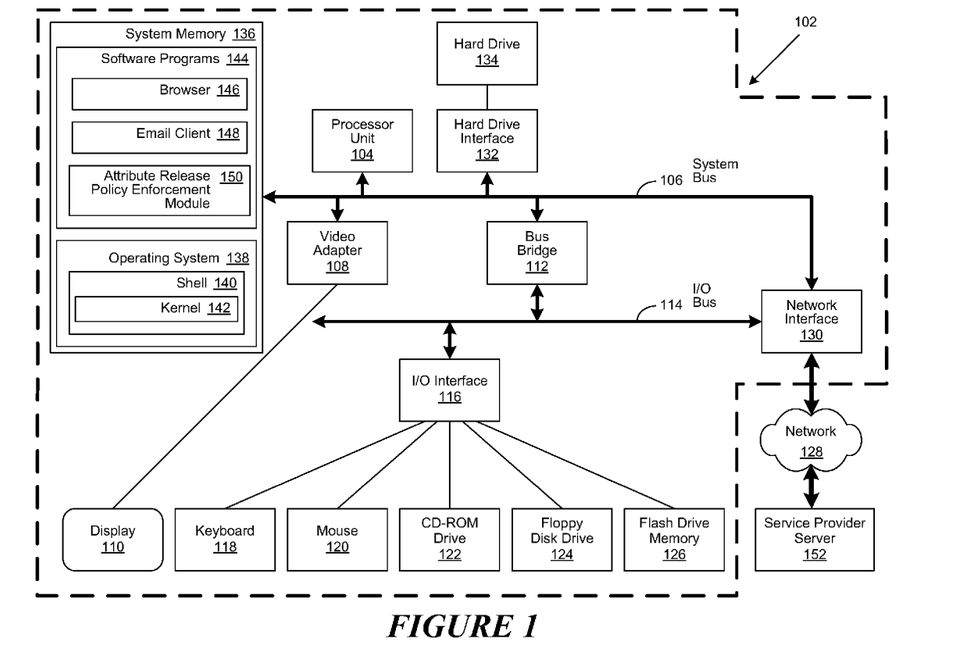
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include an attribute release policy management module 150. The attribute release policy management module 150 includes code for implementing the processes described in FIGS. 2 through 8 described hereinbelow. In one embodiment, client computer 102 is able to download the attribute release policy management module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
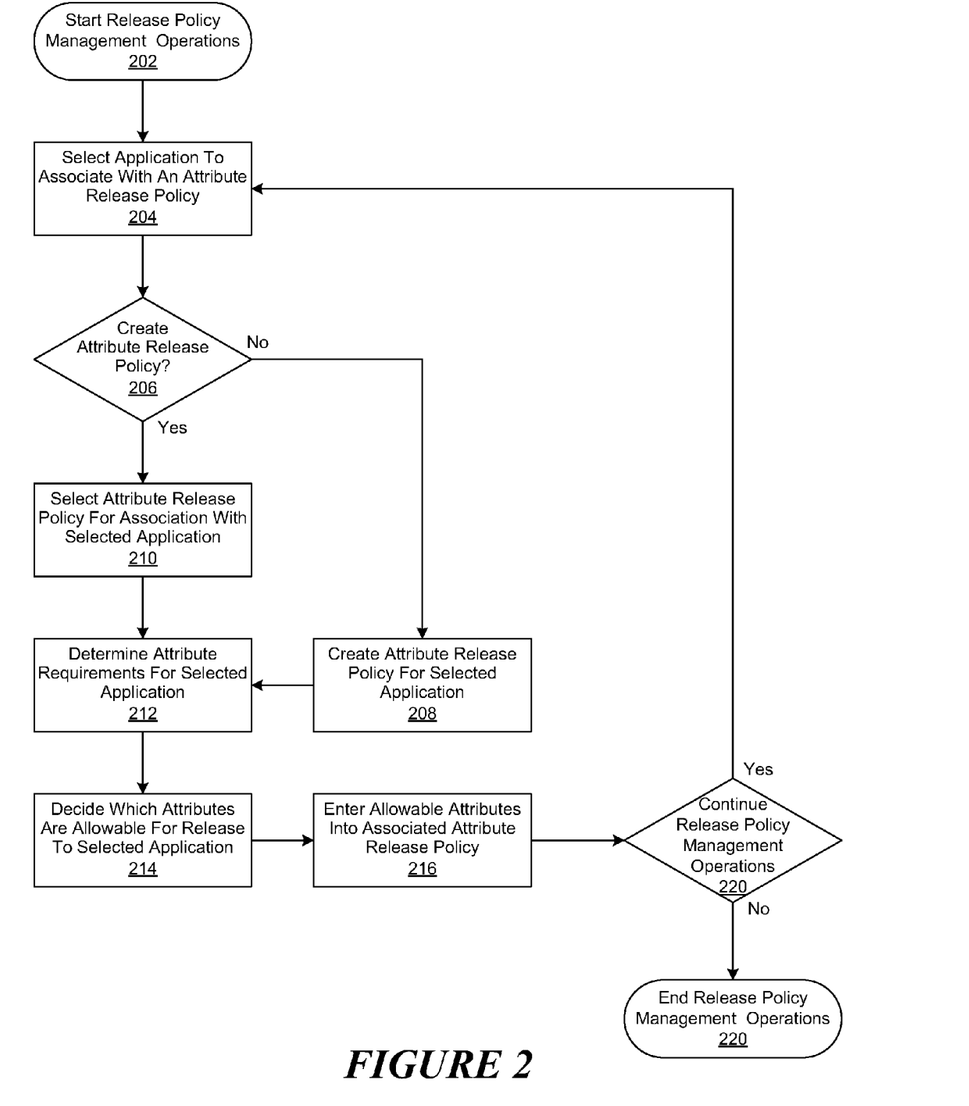
FIG. 2 is a flowchart for the management of an attribute release policy.

FIG. 2 is a flowchart for the management of an attribute release policy as implemented in accordance with an embodiment of the invention. In this embodiment, attribute release policy management operations start in step 202, followed by the selection in step 204 of an application to associate with an attribute release policy. A determination is then made in step 206 whether the creation of an attribute release policy is required. In one embodiment, the attribute release policy is centralized and supports a single attribute datastore. In another embodiment, the attribute release policy is centralized and supports a plurality of attribute datastores. In yet another embodiment, attribute release policies are distributed, each supporting one or more attribute datastores. In various embodiments, attribute release policies may be either centralized or distributed and support one or more non-datastore applications that likewise provide attributes. As an example, a data governance or data leak prevention application may provide attributes that are released according to an associated attribute release policy.

If it is decided in step 206 to create an attribute release policy for association with the selected application, then it is created in step 208. Otherwise, an attribute release policy is selected for association with the selected application in step 210. Once an attribute release policy has been created in step 208 or selected in step 210, the attribute requirements for the selected application are determined in step 212. A determination is then made in step 214 as to which of the attribute requirements are allowable for release to the selected application. The allowable attribute requirements are then entered into the attribute release policy associated with the selected application in step 216. A determination is then made in step 220 whether or not to continue attribute release policy management operations. If so, the process continues, proceeding with step 204. Otherwise, attribute release policy management operations are ended in step 222.

Figure 3:
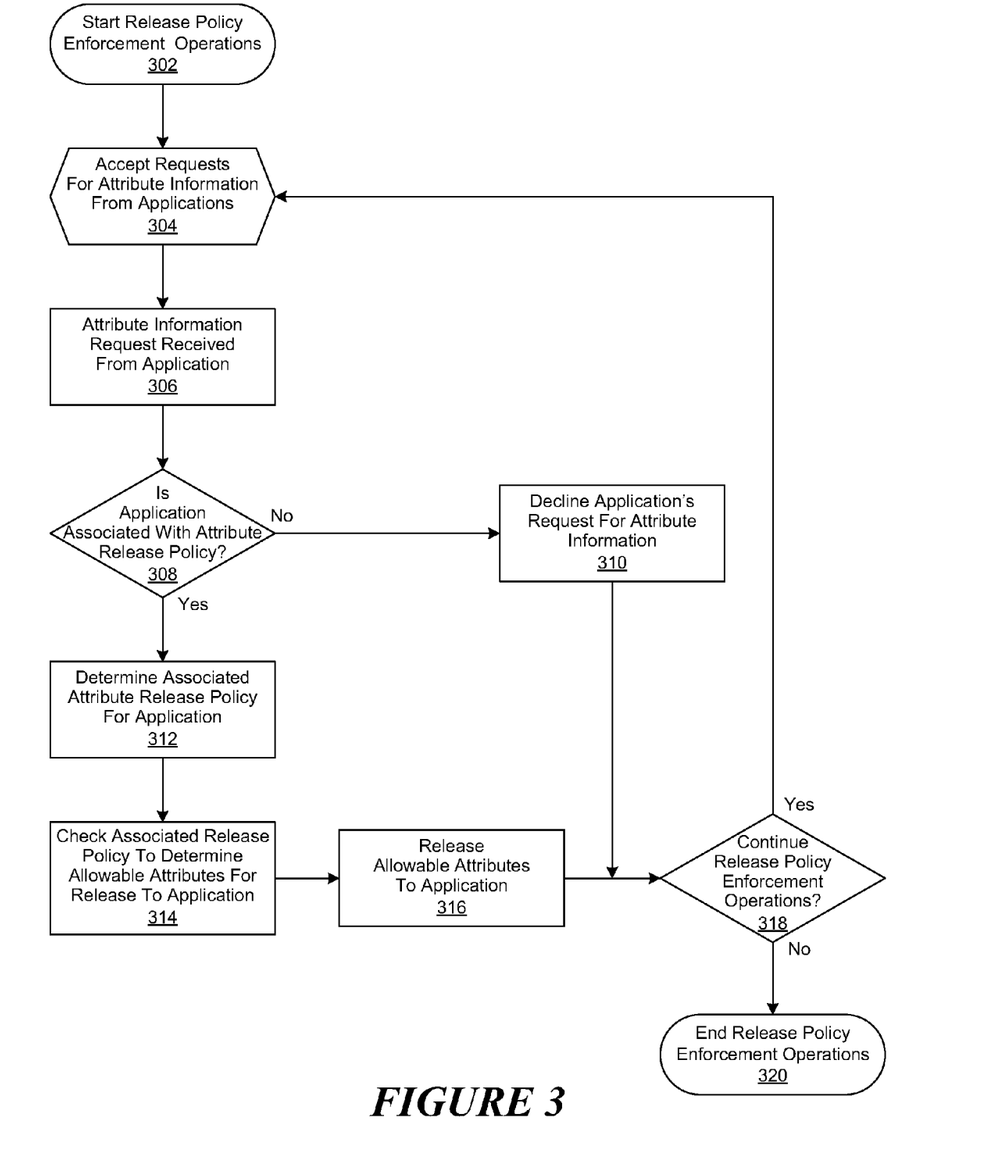
FIG. 3 is a flowchart for attribute release policy enforcement operations.

FIG. 3 is a flowchart for attribute release policy enforcement operations as implemented in accordance with an embodiment of the invention. In this embodiment, attribute release policy enforcement operations are begun in step 302, followed by accepting requests from applications for attribute information in step 304. In step 306 a request for attribute information is received from an application. A determination is then made in step 308 whether the requesting application is associated with an attribute release policy. If not, the application's request for attribute information is declined in step 310. A determination is then made in step 318 whether attribute release policy enforcement operations are to be continued. If so, the process is continued, proceeding with step 304. Otherwise, attribute release policy enforcement operations are ended in step 320.

However, if it is decided in step 308 that the requesting application is associated with an attribute release policy, then the attribute release policy associated with the requesting application is determined in step 312. Once determined, the associated attribute release policy is checked in step 314 to determine which attributes are allowable for release to the requesting application. Once determined, the allowable attributes are released to the requesting application in step 316. A determination is then made in step 318 whether attribute release policy enforcement operations are to be continued. If so, the process is continued, proceeding with step 304. Otherwise, attribute release policy enforcement operations are ended in step 320.

Figure 4:
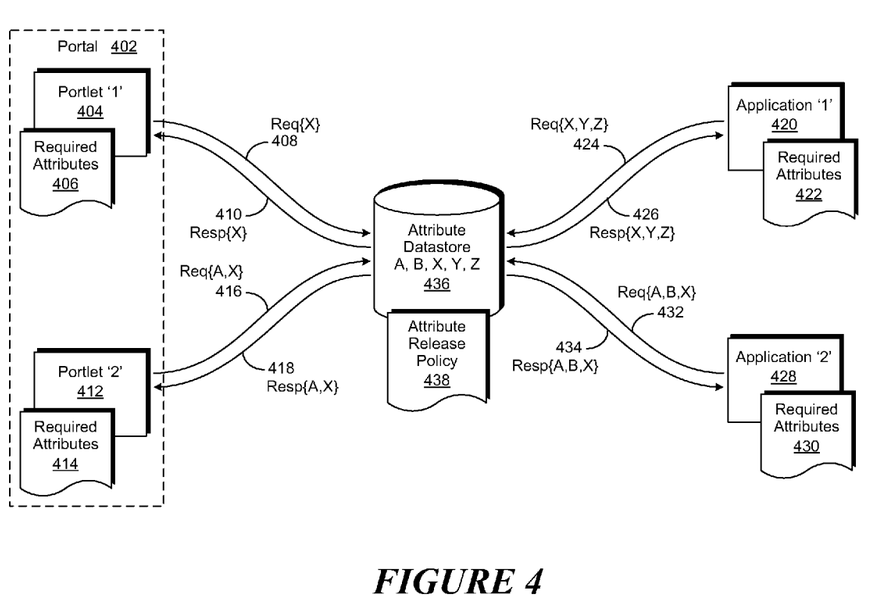
FIG. 4 shows the implementation of an attribute release policy for a centralized attribute datastore.

FIG. 4 shows the implementation of an attribute release policy for a centralized attribute datastore as implemented in accordance with an embodiment of the invention. In this embodiment, attribute release policy 438 controls the release of attributes stored in attribute datastore 436 to portlet '1' 404, portlet '2' 412, application '1' 420, and application '2' 428. As used herein, attributes are defined as any information (e.g., metadata) operable to be used to describe data or information, in whole or in part. Referring now to FIG. 4, portal 402 comprises portlet '1' 404 and portlet '2', further comprising required attributes 406, 412 respectively. Likewise, application '1' 420 further comprises required attributes 422 and application '2' 428 further comprises required attributes 430.

In one embodiment, the required attributes 422, 430 respectively used by application '1' 420 and application '2' 428 are defined on a per-application basis, while their allowable release is defined by attribute release parameters contained in the attribute release policy 438. As an example, the attribute release parameters may be based on predetermined characteristics of the attribute itself and any release controls that have been put on that attribute by the attribute owner. As another example, the attribute release parameters may be based on the context in which the attribute is released, such as what other attributes that re requested at the same time or by the same application. As yet another example, the attribute release parameters may be based on the identity of the application requesting the release of the attribute, as well as other ancillary policies, such as time of day, frequency of request, and so on.

As shown in FIG. 4, attribute datastore 436 comprises aggregated attributes 'A', 'B', 'X', 'Y', and 'Z'. Portlet '1' 404 comprises required attributes 406 and places a request 408 for attribute 'X', and if the request is allowed by attribute release policy 438, a response 410 comprising attribute 'X' is returned. Likewise, portlet '2' 412 comprises required attributes 414 and accordingly places a request 416 for attributes 'A' and 'X', and if the request is allowed by attribute release policy 438, a response 418 comprising attributes 'A' and 'X' is returned. Likewise, application '1' 420 comprises required attributes 422 and accordingly places a request 424 for attributes 'X', 'Y' and 'Z', and if the request is allowed by attribute release policy 438, a response 426 comprising attributes 'X', 'Y' and 'Z' is returned. Likewise, application '2' 428 comprises required attributes 430 and accordingly places a request 432 for attributes 'A', 'B' and 'X', and if the request is allowed by attribute release policy 438, a response 434 comprising attributes 'A', 'B' and 'X' is returned.

Figure 5:
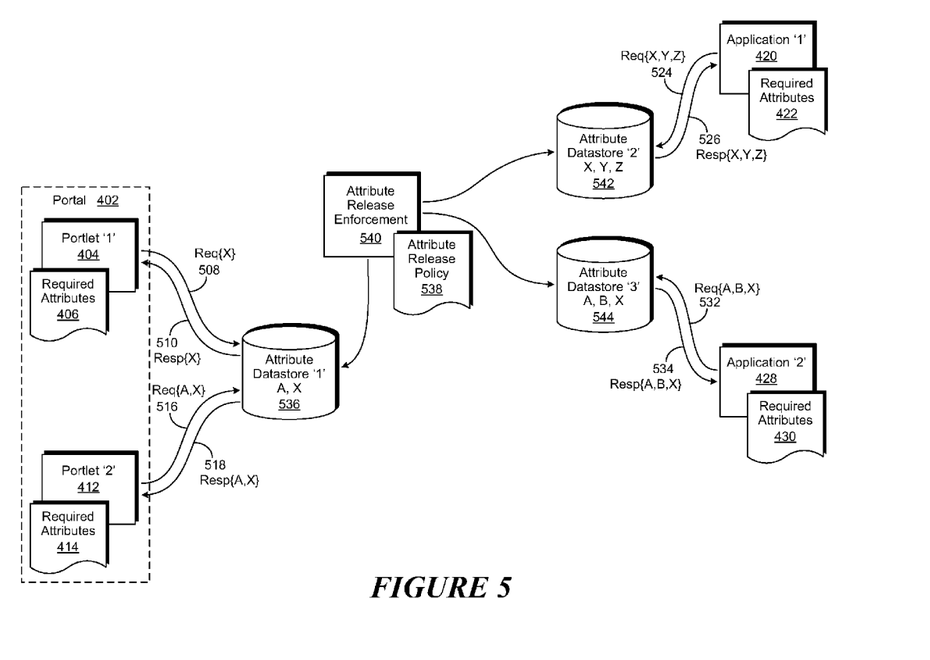
FIG. 5 shows the enforcement of an centralized attribute release policy for a plurality of attribute datastores.

FIG. 5 shows the enforcement of an centralized attribute release policy for a plurality of attribute datastores as implemented in accordance with an embodiment of the invention. In this embodiment, the release of attributes stored in attribute datastores '1' 536, '2' 542, and '3' 544 is centrally controlled by attribute release policy management module 540 according to attribute release policy 538. As shown in FIG. 5, attribute datastore 536 comprises attributes 'A', 'X', whereas attribute datastore '2' 542 comprises attributes 'X', 'Y', 'Z', and attribute datastore '3' 544 comprises attributes 'A', 'B', 'X'.

Portlet '1' 404 comprises required attributes 406 and accordingly places a request 508 for attribute 'X' from attribute datastore '1' 536. Attribute release policy management module 540 checks to see if the request is allowed by attribute release policy 538, and if so, a response 510 comprising attribute 'X' is returned. Likewise, portlet '2' 412 comprises required attributes 414 and accordingly places a request 516 for attributes 'A' and 'X'. Attribute release policy management module 540 checks to see if the request is allowed by attribute release policy 538, and if so, a response 516 comprising attributes 'A' and 'X' is returned. In one embodiment, attributes 'A' and 'X' are respectively copied by attribute release policy management module 540 from physically-separate attribute datastores '2' 542 and '3' 544 to physically-separate attribute datastore '1' 536. It will be appreciated that copying attributes 'A' and 'X' to the physically-separate attribute datastore '1' 536 provides additional security and control as portlets '1' 404 and '2' 412' are prevented from accessing other attributes stored in the physically-separate attribute datastores '2' 542 and '3' 544.

Likewise, application '1' 420 comprises required attributes 422 and accordingly places a request 524 for attributes 'X', 'Y' and 'Z' stored in attribute datastore '2' 542. Attribute release policy management module 540 checks to see if the request is allowed by attribute release policy 538, and if so, a response 526 comprising attributes 'X', 'Y' and 'Z' is returned. Likewise, application '2' 428 comprises required attributes 430 and accordingly places a request 532 for attributes 'A', 'B', and 'X' stored in attribute datastore '3' 544. Attribute release policy management module 540 checks to see if the request is allowed by attribute release policy 538, and if so, a response 534 comprising attributes 'A', 'B', and 'X' is returned.

It will be further appreciated that segregating attributes 'X', 'Y' and 'Z' to the physically-separate attribute datastore '2' 542 provides additional security and control as application '2' 428 is prevented from accessing those attributes. Likewise, segregating attributes 'A', 'B', and 'X' to the physically-separate attribute datastore '3' 544 provides additional security and control as application '1' 420 is prevented from accessing those attributes. It will likewise be apparent to those of skill in the art that data-level disclosure is provided by ensuring that application '1' 420 and '2' 428 only has access to the attributes it needs and no others, based on the contents of each application's respective and associated datastore '2' 542 and '3' 544.

Figure 6:
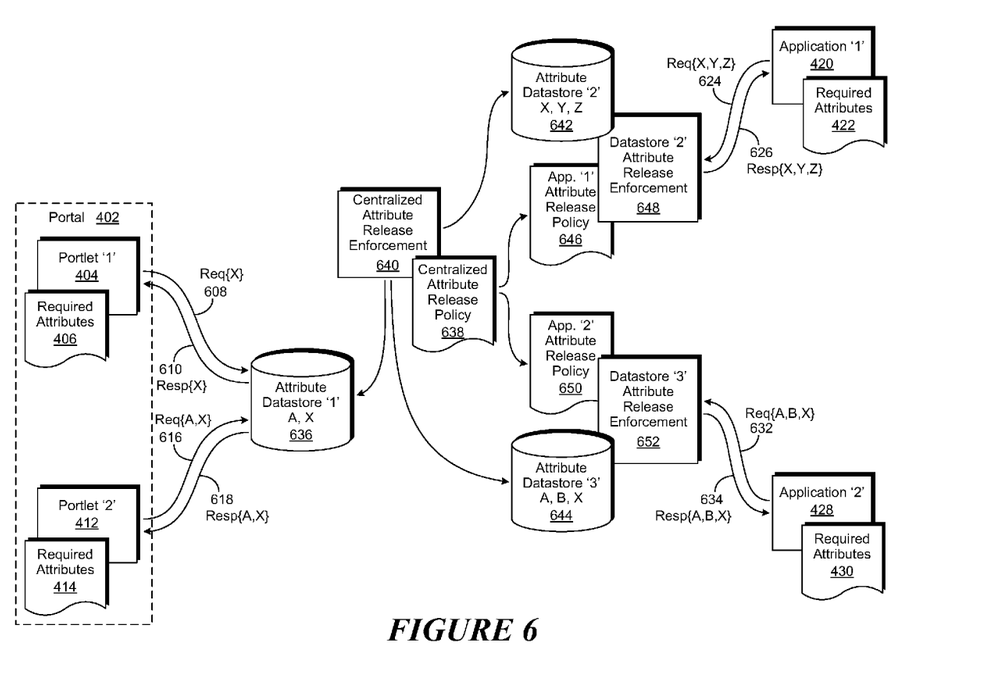
FIG. 6 shows the distributed enforcement of distributed, application-specific attribute release policies for a plurality of attribute datastores.

FIG. 6 shows the distributed enforcement of distributed, application-specific attribute release policies for a plurality of attribute datastores as implemented in accordance with an embodiment of the invention. In this embodiment, the release of attributes stored in attribute datastores '1' 636, '2' 642, and '3' 644 are centrally controlled by centralized attribute release policy management module 640 according to centralized attribute release policy 638. In turn, the centralized attribute release policy 638 is operable to update the application '1' attribute release policy 646 and the application '2' attribute release policy 650. Accordingly, the release of attributes stored in attribute datastore '2' 642 are further controlled by datastore '2' attribute enforcement module 648 according to the application '1' attribute release policy 646. Likewise, the release of attributes stored in attribute datastore '3' 644 are further controlled by datastore '2' attribute enforcement module 652 according to the application '2' attribute release policy 650. As a result, the attributes 'X', 'Y', 'Z' available to application '1' 420 from attribute datastore '2' 642 and the attributes 'A', 'B', 'X' available to application '2' 428 from attribute datastore '3' 644 are doubly-filtered.

As shown in FIG. 6, attribute datastore '1' 636 comprises attributes 'A', 'X', whereas attribute datastore '2' 642 comprises attributes 'X', 'Y', 'Z', and attribute datastore '3' 644 comprises attributes 'A', 'B', 'X'. Portlet '1' 404 comprises required attributes 406 and accordingly places a request 608 for attribute 'X' from attribute datastore '1' 636. Attribute release policy management module 640 checks to see if the request is allowed by attribute release policy 638, and if so, a response 610 comprising attribute 'X' is returned. Likewise, portlet '2' 412 comprises required attributes 414 and accordingly places a request 616 for attributes 'A' and 'X'. Attribute release policy management module 640 checks to see if the request is allowed by attribute release policy 638, and if so, a response 616 comprising attributes 'A' and 'X' is returned.

Likewise, application '1' 420 comprises required attributes 422 and accordingly places a request 624 for attributes 'X', 'Y' and 'Z' stored in attribute datastore '2' 642. The datastore '2' attribute release policy management module 648 checks to see if the request is allowed by the application '1' attribute release policy 646, and if so, a response 626 comprising attributes 'X', 'Y' and 'Z' is returned. Likewise, application '2' 428 comprises required attributes 430 and accordingly places a request 632 for attributes 'A', 'B', and 'X' stored in attribute datastore '3' 644. The datastore '2' attribute release policy management module 652 checks to see if the request is allowed by application '2' attribute release policy 650, and if so, a response 634 comprising attributes 'A', 'B', and 'X' is returned.

It will be appreciated that in addition to the advantages of physically separating attributes into discrete datastores, such an attribute release filter approach provides a proxy interface to the datastore. Accordingly, real-time, runtime-based attribute release policies are enabled, based on the requested attributes, the context associated with those attributes, and the additional context provided by the application itself.

Figure 7:
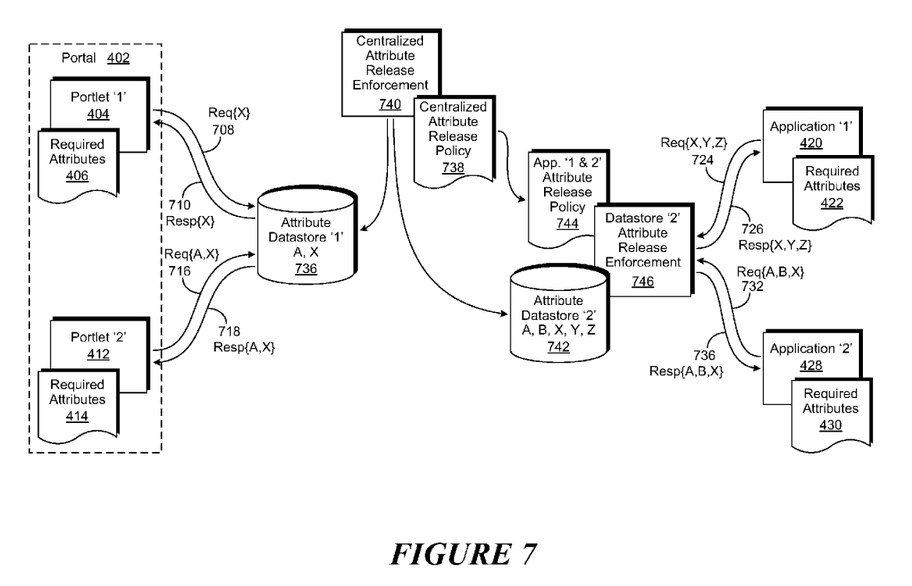
FIG. 7 shows the distributed enforcement of distributed, application-specific attribute release policies for a consolidated attribute datastore.

FIG. 7 shows the distributed enforcement of distributed, application-specific attribute release policies for a consolidated attribute datastore as implemented in an embodiment of the invention. In this embodiment, the release of attributes stored in attribute datastores '1' 736 and '2' 742 are centrally controlled by centralized attribute release policy management module 740 according to centralized attribute release policy 738. In turn, the centralized attribute release policy 638 is operable to update the application '1 & 2' attribute release policy 744. Accordingly, the release of attributes stored in attribute datastore '2' 742 are further controlled by datastore '2' attribute enforcement module 746 according to the application '1 & 2' attribute release policy 744. As a result, the attributes 'X', 'Y', 'Z' available to application '1' 420 and the attributes 'A', 'B', 'X' available to application '2' 428 from attribute datastore '2' 744 are doubly-filtered.

As shown in FIG. 7, attribute datastore '1' 736 comprises attributes 'A', 'X', whereas attribute datastore '2' 742 comprises attributes 'A', 'B', 'X', 'Y', 'Z'. Portlet '1' 404 comprises required attributes 406 and accordingly places a request 708 for attribute 'X' from attribute datastore '1' 736. Attribute release policy management module 740 checks to see if the request is allowed by attribute release policy 738, and if so, a response 710 comprising attribute 'X' is returned. Likewise, portlet '2' 412 comprises required attributes 414 and accordingly places a request 716 for attributes 'A' and 'X'. Attribute release policy management module 740 checks to see if the request is allowed by attribute release policy 738, and if so, a response 716 comprising attributes 'A' and 'X' is returned.

Likewise, application '1' 420 comprises required attributes 422 and accordingly places a request 724 for attributes 'X', 'Y' and 'Z' stored in attribute datastore '2' 742. The datastore '2' attribute release policy management module 748 checks to see if the request from application '1' 420 is allowed by the application '1 & 2' attribute release policy 744, and if so, a response 726 comprising attributes 'X', 'Y' and 'Z' is returned. Likewise, application '2' 428 comprises required attributes 430 and accordingly places a request 732 for attributes 'A', 'B', and 'X' stored in attribute datastore '2' 742. The datastore '2' attribute release policy management module 746 checks to see if the request is allowed by application '1 & 2' attribute release policy 744, and if so, a response 734 comprising attributes 'A', 'B', and 'X' is returned.

It will be appreciated that having the application '1 & 2' attribute release policy 744 take into account the identity of application '1' 420 and '2' 428 allows multiple applications to share the same attribute datastore. It will be further appreciated that such an attribute release filter approach provides a proxy interface to the datastore. Accordingly, real-time, runtime-based attribute release policies are enabled, based on the requested attributes, the context associated with those attributes, and the additional context provided by the application itself. In addition, each local attribute enforcement point (e.g., datastore '2' attribute enforcement module 746) maintains a local copy of the attribute release policy, and further only maintains the attribute release policy necessary to manage the attributes required by applications '1' 420 and '2' 428.

Figure 8:
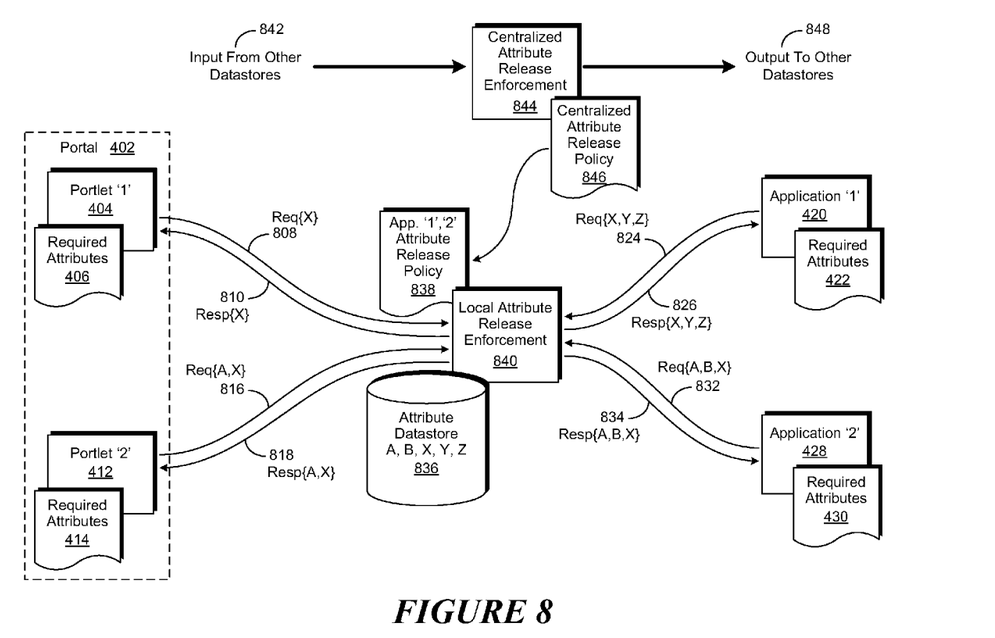
FIG. 8 shows the real-time enforcement of distributed, application-specific attribute release policies for a consolidated attribute datastore.

FIG. 8 shows the real-time enforcement of distributed, application-specific attribute release policies for a consolidated attribute datastore as implemented in accordance with an embodiment of the invention. In this embodiment, the release of attributes stored in attribute datastore 836 is controlled by local attribute release policy management module 840 according to the application '1 & 2' attribute release policy 838. In turn, the application '1 & 2' attribute release policy 838 is operable to be updated by the centralized attribute release policy 846, which in turn is controlled by centralized attribute release policy management module 844. In one embodiment, the centralized attribute release policy management module 844 is operable to receive input from other datastores 842 and to provide output to other datastores 848.

Accordingly, the release of attributes stored in attribute datastore '1' 836 are controlled by the local attribute enforcement module 840 according to the application '1 & 2' attribute release policy 838. As a result, the attributes 'X', 'Y', 'Z' available to application '1' 420 and the attributes 'A', 'B', 'X' available to application '2' 428 from attribute datastore '2' 744 are doubly-filtered. Likewise, attribute 'X' available to portlet '1' 404 and attributes 'A' and 'X' available to portlet '2' 412 are also doubly-filtered.

As shown in FIG. 8, the attribute datastore 836 comprises attributes 'A', 'B', 'X', 'Y', 'Z'. Portlet '1' 404 comprises required attributes 406 and accordingly places a request 808 for attribute 'X' from attribute datastore '1' 836. Local attribute release policy management module 840 checks to see if the request is allowed by the application '1 & 2' attribute release policy 838, and if so, a response 810 comprising attribute 'X' is returned. Likewise, portlet '2' 412 comprises required attributes 414 and accordingly places a request 816 for attributes 'A' and 'X'. The local attribute release policy management module 840 checks to see if the request is allowed by application '1 & 2' attribute release policy 838, and if so, a response 816 comprising attributes 'A' and 'X' is returned.

Likewise, application '1' 420 comprises required attributes 422 and accordingly places a request 824 for attributes 'X', 'Y' and 'Z' stored in the attribute datastore 836. The local attribute release policy management module 840 checks to see if the request from application '1' 420 is allowed by the application '1 & 2' attribute release policy 838, and if so, a response 826 comprising attributes 'X', 'Y' and 'Z' is returned. Likewise, application '2' 428 comprises required attributes 430 and accordingly places a request 832 for attributes 'A', 'B', and 'X' stored in the attribute datastore 836. The local attribute release policy management module 840 checks to see if the request is allowed by application '1 & 2' attribute release policy 838, and if so, a response 834 comprising attributes 'A', 'B', and 'X' is returned.

It will be appreciated that having the application '1 & 2' attribute release policy 838 take into account the identity of application '1' 420 and '2' 428 allows multiple applications to share the same attribute datastore. It will be further appreciated that such an attribute release filter approach provides a proxy interface to the datastore. Accordingly, real-time, runtime-based attribute release policies are enabled, based on the requested attributes, the context associated with those attributes, and the additional context provided by the application itself. In addition, each local attribute enforcement point (e.g., local attribute enforcement module 840) maintains a local copy of the attribute release policy, and further only maintains the attribute release policy necessary to manage the attributes required by applications '1' 420 and '2' 428. Additionally, this attribute release enforcement functionality is operable to provide real-time, run-time control of specific attributes within the datastore, as required, based on the requesting application.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A system comprising:
a processor;
a data bus coupled to the processor; and
a non-transitory computer-usable medium embodying computer program code, the computer-usable medium being coupled to the data bus, the computer program code controlling the distribution of data and comprising instructions executable by the processor for:
receiving a request from a first application for attribute information;
filtering the attributes stored in a first datastore according to a first attribute release policy to generate a first set of filtered attributes; and
providing the first set of filtered attributes to the first application;
providing the first set of filtered attributes to a second datastore;
filtering the first set of filtered attributes according to a second attribute release policy to generate a second set of filtered attributes; and
providing the second set of filtered attributes to a second application;
and wherein
while executing the instructions on the processor, a request is received from the second application for attribute information stored in the first datastore;
the attributes stored in the first datastore are filtered according to a second attribute release policy to generate a second set of filtered attributes from the first datastore by instructions executing on the processor; and
the second set of filtered attributes from the first datastore is provided to the second application by instructions executing on the processor.

2. The system of claim 1, wherein:
while executing the instructions on the processor, a request is received from the second application for attribute information stored in a second datastore;
the attributes stored in the second datastore are filtered according to the second attribute release policy to generate a second set of filtered data by instructions executing on the processor; and
the second set of filtered data is provided to the second application by instructions executing on the processor.

3. The system of claim 1, wherein the first attribute release policy is centralized and the second attribute release policy is distributed.

4. The system of claim 1, wherein the first attribute release policy is used to update the second attribute release policy.

5. The system of claim 1, wherein the second attribute release policy is associated with the second application.

6. The system of claim 5, wherein the second attribute release policy is used as a proxy by the second application to access the first set of filtered attributes.

7. The system of claim 1, wherein:
a plurality of first attribute release policies are stored in a centralized repository; and
individual first attribute release policies in the plurality of first attribute release policies are associated with one or more of a plurality of applications.

8. A non-transitory computer-usable medium embodying computer program code, the computer program code comprising computer executable instructions configured for:
receiving a request from a first application for attribute information;
filtering the attributes stored in a first datastore according to a first attribute release policy to generate a first set of filtered attributes; and
providing the first set of filtered attributes to the first application;
providing the first set of filtered attributes to a second datastore;
filtering the first set of filtered attributes according to a second attribute release policy to generate a second set of filtered attributes; and
providing the second set of filtered attributes to a second application; and wherein a request is received from the second application for attribute information stored in the first datastore;
the attributes stored in the first datastore are filtered according to a second attribute release policy to generate a second set of filtered attributes from the first datastore; and
the second set of filtered attributes from the first datastore is provided to the second application.

9. The computer usable medium of claim 8, wherein:
a request is received from the second application for attribute information stored in a second datastore;
the attributes stored in the second datastore are filtered according to the second attribute release policy to generate a second set of filtered data; and
the second set of filtered data is provided to the second application.

10. The computer usable medium of claim 8, wherein the first attribute release policy is centralized and the second attribute release policy is distributed.

11. The computer usable medium of claim 8, wherein the first attribute release policy is used to update the second attribute release policy.

12. The computer usable medium of claim 8, wherein the second attribute release policy is associated with the second application.

13. The computer usable medium of claim 12, wherein the second attribute release policy is used as a proxy by the second application to access the first set of filtered attributes.

14. The computer usable medium of claim 8, wherein:
a plurality of first attribute release policies are stored in a centralized repository; and
individual first attribute release policies in the plurality of first attribute release policies are associated with one or more of a plurality of applications.

15. The computer usable medium of claim 8, wherein the computer executable instructions are provided to a client computer from a server at a remote location.

16. The computer usable medium of claim 8, wherein the computer executable instructions are provided by a service provider to a customer on an on-demand basis.

* * * * *